United States Patent [19]
Kataoka et al.

[11] Patent Number: 5,866,025
[45] Date of Patent: Feb. 2, 1999

[54] MOLD FOR SYNTHETIC RESIN MOLDING

[75] Inventors: Hiroshi Kataoka, Tokyo; Masanori Mawatachi, Kanagawa, both of Japan

[73] Assignee: Asahi Kasei Kogyo Kabushiki Kaisha, Osaka, Japan

[21] Appl. No.: 849,283

[22] PCT Filed: Nov. 29, 1995

[86] PCT No.: PCT/JP95/02436

§ 371 Date: Jul. 30, 1997

§ 102(e) Date: Jul. 30, 1997

[87] PCT Pub. No.: WO96/16789

PCT Pub. Date: Jun. 6, 1996

[30]     Foreign Application Priority Data

Nov. 30, 1994  [JP]  Japan ................................. 6-296314

[51] Int. Cl.$^6$ ................................................. B29C 33/40
[52] U.S. Cl. ................... 249/114.1; 249/115; 264/338; 425/812
[58] Field of Search ....................... 249/114.1, 115; 264/338; 425/522, 542, 812

[56]         References Cited

U.S. PATENT DOCUMENTS

| 3,734,449 | 5/1973 | Itou et al. ............................ 249/114.1 |
| 4,225,109 | 9/1980 | Yotsutsuji et al. ................... 249/114.1 |
| 5,248,732 | 9/1993 | Drzewinski .............................. 525/133 |
| 5,362,226 | 11/1994 | Kataoka et al. ...................... 249/114.1 |
| 5,431,367 | 7/1995 | Baumgartner et al. ............... 249/114.1 |
| 5,431,873 | 7/1995 | Vandenberghe ....................... 249/114.1 |
| 5,458,818 | 10/1995 | Kim et al. ............................. 249/114.1 |
| 5,653,932 | 8/1997 | Aida et al. ............................ 249/114.1 |

FOREIGN PATENT DOCUMENTS 5-169458  7/1993  Japan .

*Primary Examiner*—Robert Davis
*Attorney, Agent, or Firm*—Birch, Stewart Kolasch & Birch, LLP

[57]           ABSTRACT

A mold for molding a synthetic resin coated with a highly durable thick heat insulating layer, and a molding method using the same are provided. The present invention relates to a mold comprising a base mold comprising a metal, with its inner wall constituting the mold cavity being coated with a heat insulating layer, wherein the heat insulating layer comprises a polymer alloy comprising (A) a heat-resistant non-crystalline resin of a linear high-molecular weight polymer containing an aromatic ring in the main chain thereof and having a glass transition temperature of not lower than 150° C. and an elongation at break of not less than 10% and (B) a cured thermosetting resin at a (A)/(B) mixing ratio of 40/60 to 5/95 by weight; and further relates to a molding method using the mold.

13 Claims, 3 Drawing Sheets

0.1mm

|—|
0.1mm

MOLD FOR SYNTHETIC RESIN MOLDING

TECHNICAL FIELD

This invention relates to a mold for molding a synthetic resin and a molding method using the same. More particularly, the present invention relates to a heat insulating layer-coated mold for injection molding, blow molding, vacuum forming, compression molding, etc. which is endurable to molding of tens of thousands time, and a molding method using the same.

BACKGROUND ART

In injecting a thermoplastic resin into a cavity of a mold, improvement of reproducibility in imparting the mold surface profile on the molded article and improvement of gloss of the molded article can usually be achieved to some extent by making a proper selection of molding conditions, for example, by increasing the resin temperature, the mold temperature or the injection pressure.

Of these factors, a mold temperature is the most influential. The higher the mold temperature, the better the appearance of the resulting molded article. However, an increase in mold temperature makes a time required for cooling the plasticized resin longer, leading to a reduction in molding efficiency. Therefore, it has been demanded to develop a molding technique for achieving improved mold surface reproducibility without increasing the mold temperature or, even if the mold temperature is increased, without requiring an extension of a cooling time. A method comprising introducing a heat transfer medium and a coolant alternatively into the respective holes of a mold to make a heating and cooling cycle has been adopted. However, this method involves high consumption of heat and extended heating and cooling times, making the molding cycle time longer.

Many reports have been made to date on a method for improving mold surface reproducibility comprising coating a cavity wall of a mold with a substance having a small thermal conductivity, i.e., a heat insulating layer. For example, WO 93/06980 suggests use of polyimide as an insulating layer, and JP-A-54-142266 (the term "JP-A" as used herein means an "unexamined published Japanese patent application") discloses the use of an epoxy resin as an insulating layer.

The merit of injection molding and the like resides in that an article of complicated shape can be obtained through a single shot. Therefore, the molds used in these molding methods usually have a complicatedly shaped cavity. On the other hand, the heat insulating layer of a heat insulating layer-coated mold has a thickness of about 0.1 to 0.2 mm for general injection molding but, under some molding conditions, the heat-insulating layer for use even in injection molding should have a thickness of about 0.2 to 0.5 mm. For blow molding, the insulating layer should have a thickness of not less than 0.3 mm and, in some cases, 0.4 mm or more. It has been demanded to uniformly and economically provide such a thick heat insulating layer on a cavity wall of complicated shape.

Uniform formation of a thick heat insulating layer on a cavity wall having a complicated shape has conventionally been carried out by repeating formation of a thin coating layer by spray coating or brush coating followed by hardening by, for example, heating several times or, in some cases, several tens of times until a desired thickness is reached. If a cavity wall of complicated shape is coated thick at a time, the coating sags during application, making it difficult to provide a coating layer of uniform thickness on the cavity wall of complicated shape. A quantitative sag (Q) is generally considered to be proportional to the thickness (t) of a coating film immediately after being applied, being represented by the following equation:

$$Q = d \cdot g \cdot t^3 / \eta$$

wherein Q represents a sag amount; d represents a specific gravity of a coating; g represents an acceleration of gravity; and η represents a viscosity of the coating; and t represents a thickness of a coating film.

In order to apply a coating to a uniform thickness while minimizing a sag amount (Q), it is necessary to reduce the amount of the coating applied at a time to reduce the coating thickness (t). In other words, the steps of applying a coating thinly and solidifying by heating, crosslinking, etc. had to be repeated many times to increase the coating thickness stepwise. In order to form a coating film as thickly as possible at a time without causing sags, it is desirable that the coating to be applied by spray coating or brush coating has a reduced solvent content, i.e., a high concentration. However, a highly concentrated coating generally has a high viscosity and is difficult to apply uniformly.

Hence, a coating which has a high concentration and yet has a low viscosity is preferred. From this viewpoint, a coating solution comprising a low-molecular weight substance which can be converted to a high-molecular weight substance upon reaction after application is preferred. Thermosetting resins, such as epoxy resins, are extremely favorable coatings in this aspect. However, a cured epoxy resin is generally brittle with a small elongation because of involvement of crosslinking. Therefore, if applied to a mold cavity wall made of metal, it tends to undergo cracking under the heating/cooling cycles of molding. Further, a heat insulating layer covering the mold surface is also required to have heat resistance. It is necessary to improve heat resistance and toughness of a cured epoxy resin which are conflicting with each other, in case of using a cured epoxy resin as a heat insulating layer.

A method of adding rubber of various kinds, such as nitrile rubber, to an epoxy resin has been in long use for making a cured epoxy resin tough. However, the effect of addition of rubber is hardly manifested in a heat-resistant cured epoxy resin having a high crosslinking degree, i.e., a small molecular weight among crosslinking bonds. Further, it is preferable that the heat insulating layer formed on a mold surface be easy to be polished to provide a mirror surface.

What is required of a heat insulating layer is to have satisfactory coating properties in providing a large coating thickness, to have heat resistance and elongation at break to secure durability against molding, and to have hardness and polishability to give a mirror surface. Thus, it has been demanded to provide a mold coated with a heat insulating layer having improved heat resistance and improved toughness while retaining the excellent workability possessed by a thermosetting resin, such as an epoxy resin.

DISCLOSURE OF THE INVENTION

In order to solve the above described problems, the inventors of the present invention have extensively studied heat insulating materials for providing a heat insulating layer covering the surface of a base mold and, as a result, reached the present invention.

The present invention is as follows:

(1) A mold for molding a synthetic resin which comprises a base mold comprising a metal, the inner wall constituting the mold cavity being coated with a heat insulating layer having a thickness of 0.05 to 2 mm, wherein the heat insulating layer comprises a polymer alloy comprising (A) a heat-resistant non-crystalline resin of a linear high-molecular weight polymer containing an aromatic ring in the main chain thereof and having a glass transition temperature of not lower than 150° C. and an elongation at break of not less than 10% and (B) a cured thermosetting resin at a mixing ratio (the heat-resistant non-crystalline resin/the cured thermosetting resin) of from 40/60 to 5/95 by weight.

(2) The mold for molding a synthetic resin according to (1) above, wherein the mixing ratio (the heat-resistant non-crystalline resin/the cured thermosetting resin) is 35/65 to 10/90 by weight.

(3) The mold for molding a synthetic resin according to (1) above, wherein the mixing ratio (the heat-resistant non-crystalline resin/the cured thermosetting resin) is 30/70 to 15/85 by weight.

(4) The mold according to any one of (1) to (3) above, wherein the heat insulating layer has a thickness of 0.3 to 1 mm.

(5) The mold for molding a synthetic resin according to any one of (1) to (4) above, wherein the cured thermosetting resin is a cured epoxy resin.

(6) The mold for molding a synthetic resin according to any one of (1) to (4) above, wherein the cured thermosetting resin is a polycyanurate.

(7) The mold for molding a synthetic resin according to any one of (1) to (4) above, wherein the heat-resistant non-crystalline resin is a resin selected from polyether sulfone, polyether imide and polysulfone.

(8) The mold for molding a synthetic resin according to any one of (1) to (7) above, wherein the polymer alloy is the one formed from a compatible mixture of the heat-resistant non-crystalline resin and the thermosetting resin through phase separation induced by curing of the thermosetting resin, and the polymer alloy has a structure in which the two phases are mutually finely dispersed and the dispersed particles are continuous or partially continuous.

(9) The mold for molding a synthetic resin according to any one of (1) to (8) above, wherein the heat insulating layer is formed by providing a heat insulating layer on the inner wall of the base mold to a larger thickness than predetermined and cutting the surface of the heat insulating layer by a machine tool to a predetermined thickness.

(10) The mold for molding a synthetic resin according to (9) above, wherein the machine tool is numerically controlled.

(11) The mold for molding a synthetic resin according to any one of (1) to (10) above, wherein the heat insulating layer comprising at least a layer comprising the polymer alloy described in any one of (1) to (8) above and a layer comprising a linear high-molecular weight polymer, and the layer comprising the polymer alloy layer has a thickness of at least half the total thickness of the heat insulating layer.

(12) The mold for molding a synthetic resin according to any one of (1) to (11) above, wherein the heat insulating layer has, provided thereon as an outermost layer, a metallic layer having a thickness of not more than 1/5 of the total thickness of the heat insulating layer.

(13) The mold according to any one of (1) to (12) above, wherein the heat insulating layer or both the heat insulating layer and the outermost metallic layer have a large number of fine pores, and the base mold has passageways for discharging gas from the fine pores.

(14) A method for molding a synthetic resin which comprises using the mold described in any one of (1) to (13) above.

(15) The molding method according to (14) above, wherein the method is blow molding.

(16) The molding method according to (14) above, wherein the method is injection molding.

The present invention is described in detail below.

The synthetic resins which can be molded by the use of the mold of the present invention are thermoplastic resins that can be used in general injection molding, blow molding, vacuum forming, compressing molding, and the like. The thermoplastic resins include polyolefins, such as polyethylene and polypropylene; styrene resins, such as polystyrene, styrene-acrylonitrile copolymers, rubber-reinforced polystyrene and ABS resins; polyamide resins, polyester resins, polycarbonate resins, methacrylic resins, and vinyl chloride resins. These synthetic resins may contain 1 to 60% of reinforcements, such as rubber of various kinds, various fibers (e.g., glass fiber and carbon fiber), and inorganic powder (e.g., talc, calcium carbonate, and kaolin).

The base mold made of metal as referred to in the present invention includes metallic molds generally used for molding synthetic resins, which are made of iron, a steel mainly comprising iron, aluminum or an alloy mainly comprising aluminum, a zinc-based alloy, e.g., ZAS or a beryllium-copper alloy. Molds made of steel are preferably used. The surface of the base mold constituting the mold cavity is preferably plated with hard chrome, nickel, etc.

The thermosetting resin as referred to in the present invention is applied in a monomeric or oligomeric state and cured after being applied upon, e.g., crosslinking induced by a curing agent, such as a crosslinking agent, or by heat. The thermosetting resin to be used is preferably selected from among those providing a cured product having relatively high heat resistance and toughness.

The epoxy resin which can be preferably used as a thermosetting resin in the invention contains at least two epoxy groups in average per molecule. Such a compound is a saturated or unsaturated and aliphatic, aromatic or heterocyclic compound which may contain substituents, such as a halogen atom, a hydroxyl group and an ether group. Particularly satisfactory epoxy compounds include (1) polyphenol glycidyl ethers, (2) polyphenyl ether glycidyl ethers, (3) aromatic glycidyl compounds, and (4) polynucleic aromatic glycidyl ethers.

The polyphenol glycidyl ethers are obtained by reacting epichlorohydrin and a polyphenol in the presence of an alkali. Examples of suitable polyphenols include 2,2-bis(4-hydroxyphenyl)propane, 1,1',2,2'-tetrakis(4-hydroxyphenyl) ethane, $\alpha,\alpha,\alpha',\alpha',\alpha'',\alpha''$-hexakis(4-hydroxyphenyl)1,3,5-triethylbenzene, 1,3,5-trihydroxybenzene and 1,1,5,5-tetrakis(hydroxyphenyl)pentane. Additionally included is a novolak glycidyl ether obtained by reacting epichlorohydrin with a novolak obtainable by the reaction between a hydroxyphenol and formalin.

Preferred examples of the polyphenyl ether glycidyl ether include a glycidyl ether of dihydroxydiphenyl ether.

An epoxy resin prepolymer synthesized from bisphenol A and epichlorohydrin has the following structural formula:

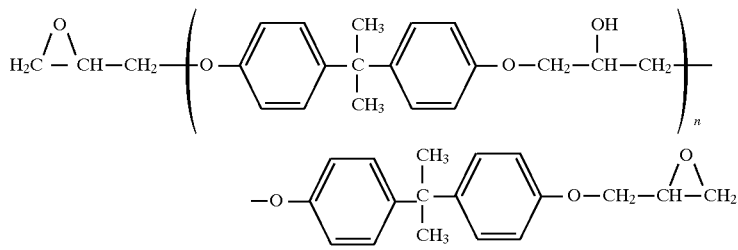

wherein n represents 0 to 20.

A typical epoxy resin synthesized from bisphenol A, tetrabromobisphenol A and epichlorohydrin has the following structural formula:

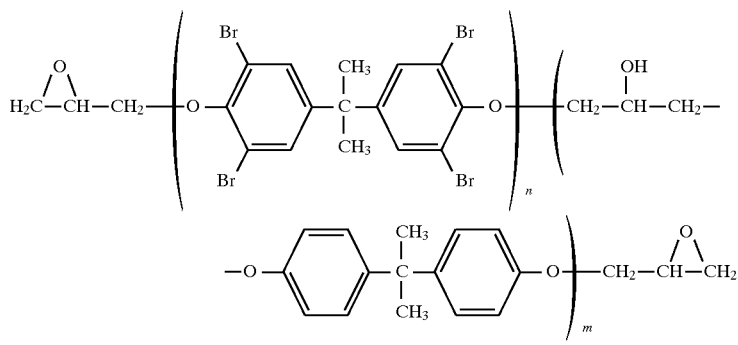

As the number n increases with respect to the number m, the flame retardance increases.

A suitable example of the aromatic glycidyl compound is 1,3,5-tri(epoxyethyl)benzene.

The polynucleic glycidyl ether includes naphthalenediol glycidyl ether and novolak glycidyl ether having the following structural formula:

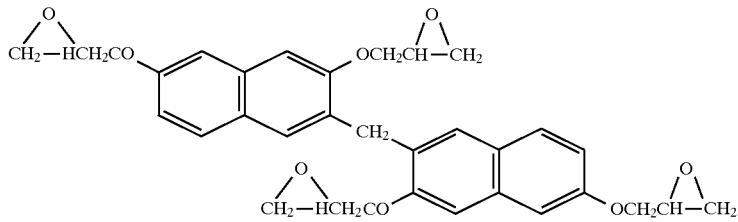

The glycidyl ether-glycidyl benzene preferably includes the one having the following structural formula:

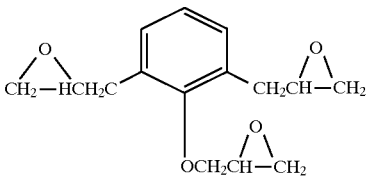

Typical examples of epoxy resins which provide a cured product having a high glass transition temperature and which can be preferably used in the present invention are shown below.

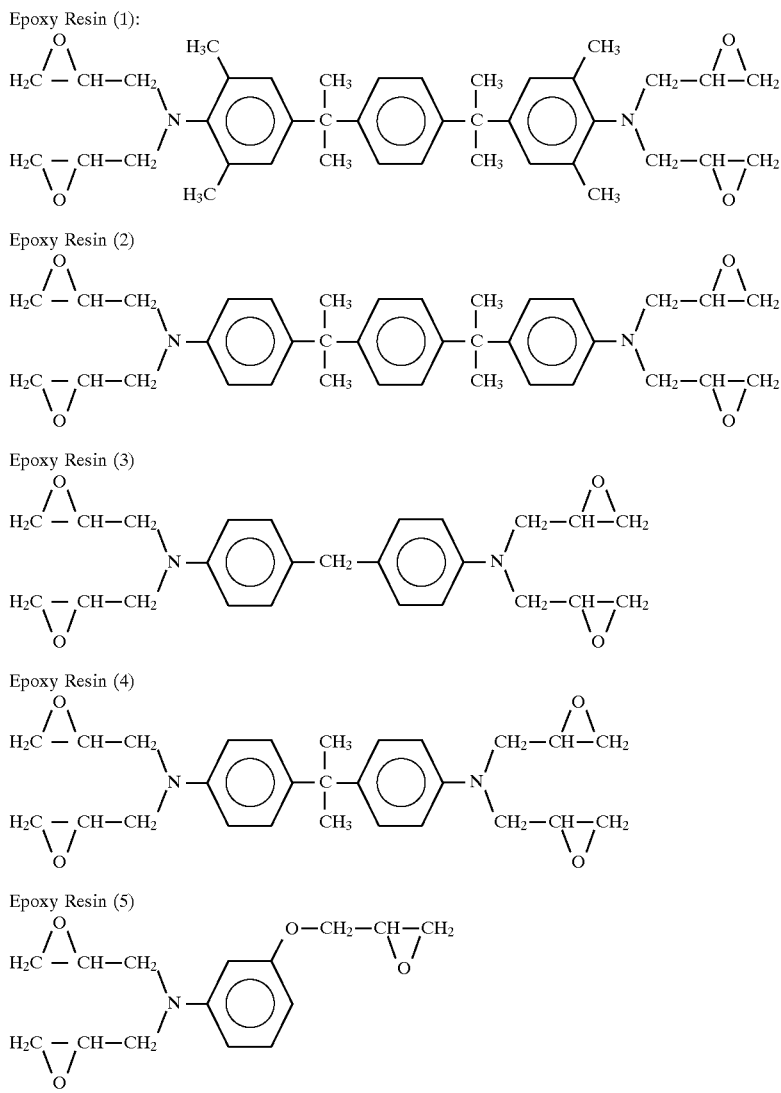

These epoxy resins are cured by addition of a curing agent. The curing agent reacts with the epoxy resin to form a three-dimensional network. Curing agents are divided into active type and latent type according to the mechanism of action, or divided into polyaddition type and catalyst type according to the mechanism of reaction. Every type embraces a number of compounds, and the curing agent to be used is appropriately selected therefrom taking into consideration the heat resistance and elongation at break required of the cured epoxy resin of the present invention. The curing agents include a great number of kinds. Examples of those of active type and further of polyaddition type, for instance, are diethylenetriamine, triethylenetetramine, tetraethylenepentamine, diethylaminopropylamine, menthenediamine, isophoronediamine, N-aminoethylpiperazine, bis(4-amino-3-methylcyclohexyl)methane, bis(4-aminocyclohexyl) methane, m-xylenediamine, diaminodiphenylmethane, m-phenylenediamine, diaminodiphenylsulfone, 2,2-bis[4-(4-aminophenoxy)phenyl]propane, phthalic anhydride, tetrahydrophthalic anhydride, hexahydrophthalic anhydride, methyltetrahydrophthalic anhydride, methylhexahydrophthalic anhydride, dodecylsuccinic anhydride, chlorendic anhydride, pyromellitic anhydride, benzophenonetetracarboxylic acid anhydride, ethylene glycol bis(anhydrotrimate), methylcyclohexenetetracarboxylic acid anhydride, trimellitic anhydride, polyazelaic acid anhydride, polymercaptane and polysulfide.

Examples of those of active type and further of catalyst type are 2,4,6-tris(dimethylaminomethyl)phenol, 2-ethyl-4-methylimidazole and a $BF_3$ monoethylamine complex.

Examples of the curing agent which brings about a cured epoxy resin and which are preferably used in the present invention are shown below by way of chemical formula:

Curing Agent (1):

$$H_2N-\underset{}{\bigcirc}-\underset{\underset{O}{\|}}{\overset{\overset{O}{\|}}{S}}-\underset{}{\bigcirc}-NH_2$$

Curing Agent (2):

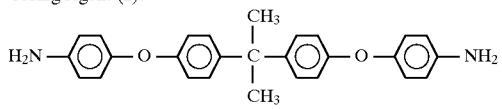

Curing Agent (3):

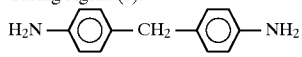

In addition, diaminodicyclohexylmethane having the formula of curing agent (3) with its benzene ring replaced by a cyclohexane ring is also used satisfactorily.

Cured epoxy resins obtained by combinations of epoxy resins (1) to (5) and curing agents (1) to (3) have a high glass transition temperature and are satisfactory for use in the present invention.

A cured epoxy resin is usually rigid and lacks toughness, having a small elongation at break. Many reports have been made to date on techniques of imparting toughness to an epoxy resin. Generally accepted techniques include (1) adjustment of the molecular weight between crosslinking bonds, (2) introduction of a soft molecular skeleton, (3) internal plasticization, and (4) introduction of a different structure or a different material. In the present invention, these manipulations are adopted to increase the elongation at break as long as the glass transition temperature falls within the range specified in the present invention.

The curing agents of latent type are then described. Because an epoxy resin mixed with a curing agent has a limited pot life, it is a practice generally followed to formulate the system into a two pack type, in which an epoxy resin is mixed with a curing agent immediately before use. A curing agent of latent type is of such type that, when it is mixed with an epoxy resin, the mixture can be stored for a long time without changing its characteristics under a given temperature condition and can rapidly cure upon, for example, heating to a certain temperature. Such latent type curing agents are classified as shown in Table 1 below according to how the curing reaction initiates. Heat, light, moisture or pressure acts as a trigger to initiate the curing reaction.

TABLE 1

| Trigger | Mechanism of Curing Initiation | Typical Compound or Means |
|---|---|---|
| heat | ionic reaction dissolution | Lewis acid complexes dicyandiamide, imidazole compounds, organic acid |

TABLE 1-continued

| Trigger | Mechanism of Curing Initiation | Typical Compound or Means |
|---|---|---|
| " | decomposition | hydrazides, diaminomaleonitrile, melamine and its derivatives, polyamine salts amineimide compounds |
| " | elution | sealing into molecular sieves |
| " | destruction of partitioning wall | micro-encapsulation |
| light | decomposition | aromatic diazonium salts, diallyl iodonium salts, triallylsulfonium salts, triallylselenium salts |
| moisture | decomposition | ketimine compounds |
| pressure | elution destruction of partitioning wall | sealing into molecular sieves micro-encapsulation |

Of these latent type curing agents preferred are those which initiate the curing reaction by the action of heat as a trigger. Particularly preferred are those of partitioning wall destruction type, in which the microcapsule wall is destroyed above a given temperature to initiate the curing reaction. The details of the latent type curing agents of partitioning wall destruction type are described in Coating Jihoh, No. 183, pp. 1–12 (1989), published by Asahi Chemical Industry Co., Ltd., ibid, No. 184, p. 9–17 (1989), and ibid, No. 187, pp. 1–8 (1990). A one-pack type preparation comprising Novacure (a trade name, produced by Asahi Chemical Industry Co., Ltd.) and an epoxy resin is characterized by exhibiting satisfactory storage stability even at 40° to 50° C., still more at room temperature, and curing at a relatively low temperature of 70° to 80° C. Generally available one-pack type preparations are usually cured by heating at not lower than 80° C. for at least several hours. The curing is often followed by post-curing at 100° C. or higher for several hours in order to obtain the intended characteristics. On the other hand, once the one-pack type preparation using Novacure initiates the curing reaction on receipt of a slight amount of heat, the curing reaction proceeds simply by allowing the system to stand at room temperature owing to the specific curing mechanism of Novacure.

In the present invention polycyanurates are also satisfactorily used as a cured thermosetting resin. Suitable polycyanurates are aromatic ones having both a high glass transition temperature and a high elongation at break. Preferred of them are those having a triazine ring as represented by the following structural formula:

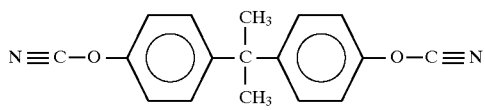

DICYANATE MONOMER

HEAT ↓

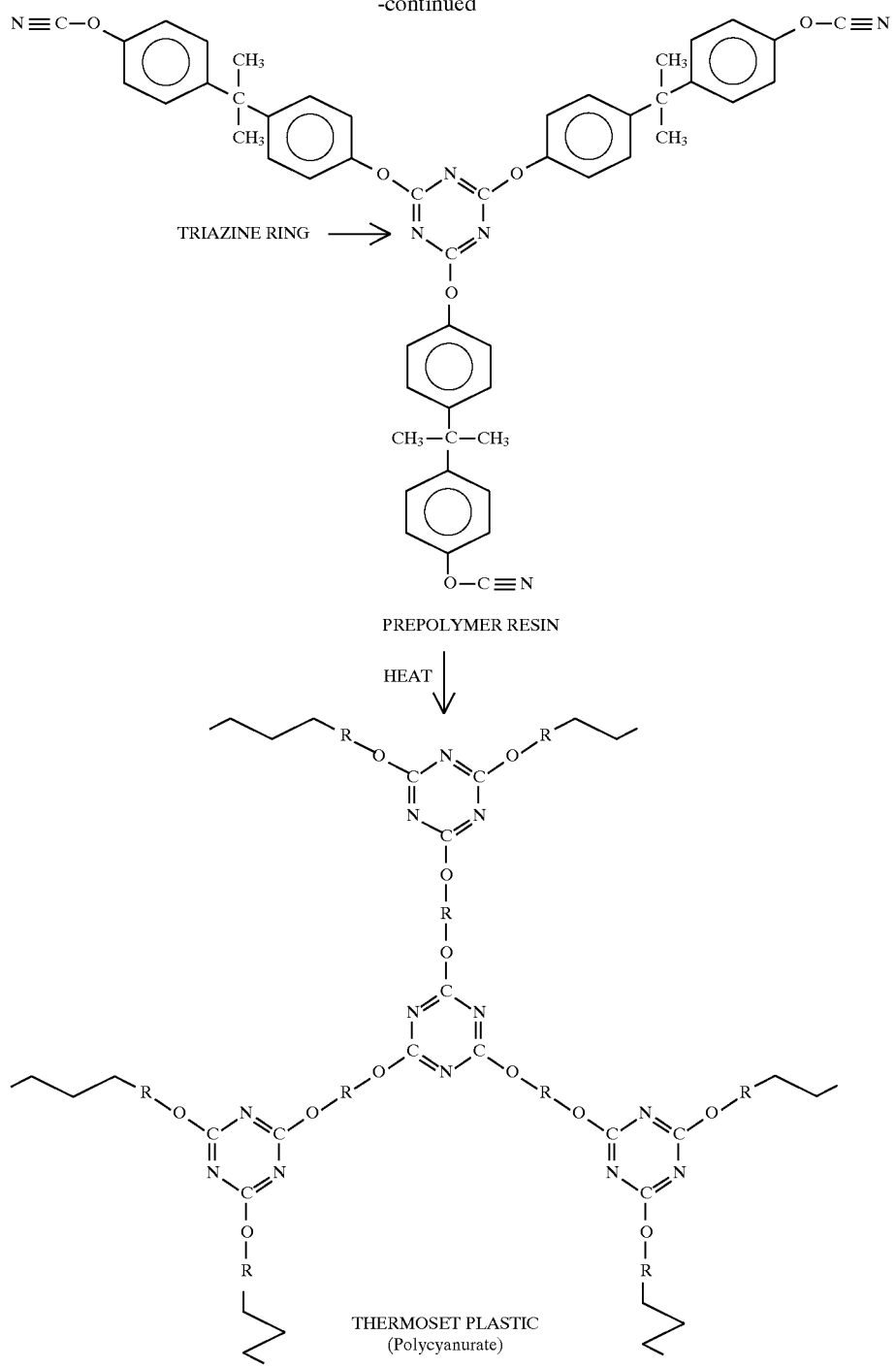

Polycyanurates are formed from a dicyanate monomer through a prepolymer as illustrated above. Dicyanate monomers, other than that shown above, which can be satisfactorily used in the present invention are shown below.

These polycyanurates have a relatively high glass transition temperature and a relatively high elongation at break and are satisfactorily used in the present invention.

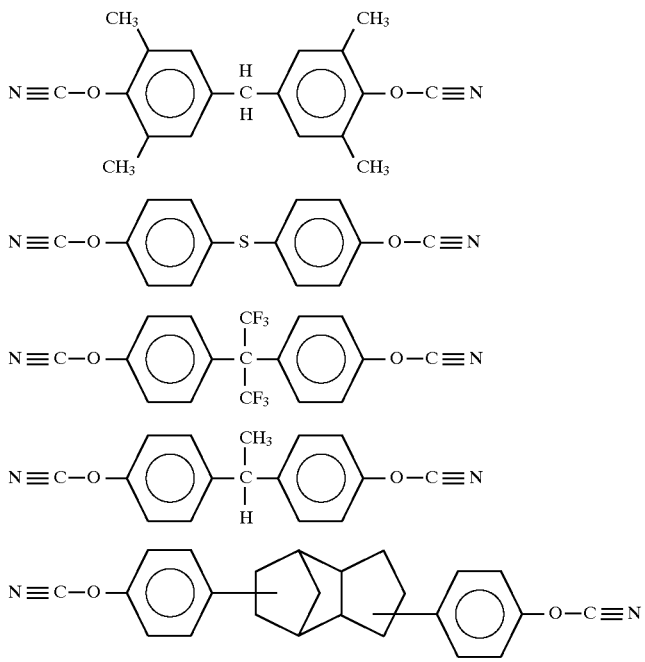

In addition, a cured thermosetting resin obtained by mixing an epoxy resin and a dicyanate monomer to carry out a curing reaction is also useful in the present invention. The curing reaction of a mixture of an epoxy resin and a dicyanate monomer involves the following three reactions concurrently, and the resulting mixture is also satisfactorily used in the present invention.

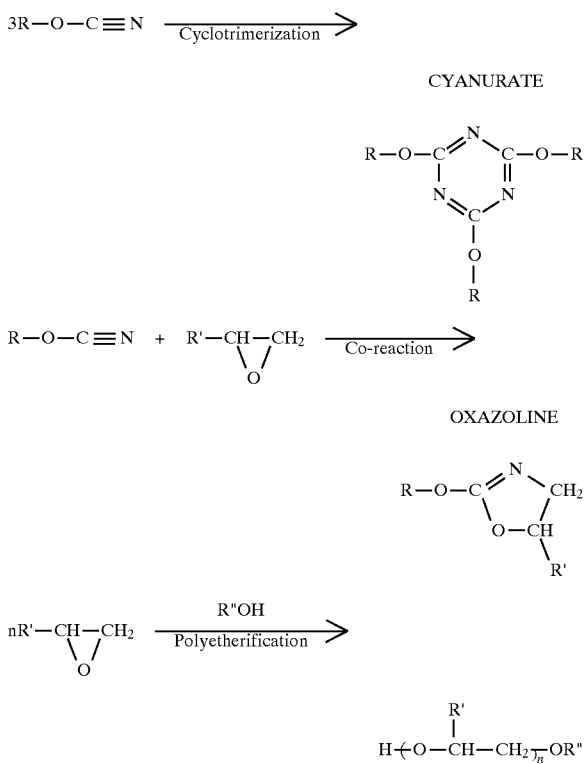

In the present invention, the heat-resistant non-crystalline resin should be a linear high-molecular weight polymer having an aromatic ring in the main chain thereof and having a glass transition temperature of not lower than 150° C., preferably not lower than 180° C., still preferably not lower than 200° C., and an elongation at break of not less than 10%, preferably not less than 15%.

The term "high-molecular weight polymer" as used herein means a substance having a sufficiently high molecular weight to the extent that its molecules are sufficiently entangled with each other enough for full manifestation of physical and chemical properties as a synthetic resin.

A polymer increases its viscosity with its degree of polymerization. The relation of viscosity vs. degree of polymerization varies depending on the kind of the polymer and is represented by the following two formulae, which depends on whether the molecular weight is above or below the molecular weight called a "critical molecular weight".

When the molecular weight is below the critical molecular weight, $$\text{Log } \eta = a \log Mw + K(T)$$

$$1 < a < 1.8$$

wherein $K(T)$ is a constant decided by a substance and a temperature; $Mw$ is a weight average molecular weight; and $\eta$ is a viscosity.

When the molecular weight of a polymer is above a certain level, the viscosity $\eta$ drastically increases in proportion to the 3.4th power of the molecular weight $Mw$. In this case, the relationship is represented by the following formula (famous as Floly-Fox's 3.4th power law):

$$\text{Log } \eta = 3.4 \text{ Log } Mw + K(T)$$

This phenomenon is accounted for as follows. In a polymer having a higher molecular weight than the critical molecular weight, long molecules are entangled with each other so that one molecule cannot move without dragging the others, which drastically increases the viscosity. The critical molecular weight, in terms of weight average molecular weight, is about 10000 to 40000 while somewhat varying depending on the kind of the molecules.

In general, polymers whose molecular weight considerably exceeds the critical molecular weight are used as a synthetic resin or synthetic fiber, while polymers whose molecular weight is around or smaller than the critical molecular weight are not used as a synthetic resin. It is not until a polymer has a high molecular weight fairly exceeding the critical molecular weight and shows sufficient entanglement among their molecules that the physical and chemical properties as a synthetic resin are manifested for use as a high-molecular weight polymer as referred to in the present invention.

The term "elongation at break" as used herein is a value measured in accordance with ASTM-D638 at a pulling speed of 5 mm/min. A non-crystalline resin having a high elongation at break and excellent heat resistance has excellent impact resistance and stands a heating and cooling cycle test. The heat-resistant non-crystalline resin is preferably the one having satisfactory compatibility with the thermosetting resin that is before crosslinked, still preferably the one dispersible on a molecular level. Suitable resins include polysulfone, polyether sulfone and polyether imide. Polyether sulfone is particularly compatible with an epoxy resin.

Typical examples of the polysulfone suitable in the practice of the invention are aromatic polysulfones comprising the following repeating unit and having excellent heat-resistance and impact-resistance:

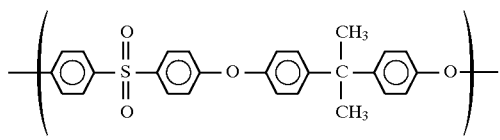

Typical examples of the polyether sulfone suitable in the practice of the invention are aromatic polyether sulfones comprising the following repeating unit and having excellent heat-resistance and impact-resistance:

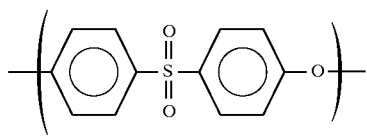

Typical examples of the polyether imide suitable in the present invention are aromatic polyether imides comprising the following repeating unit and having excellent heat-resistance and impact-resistance:

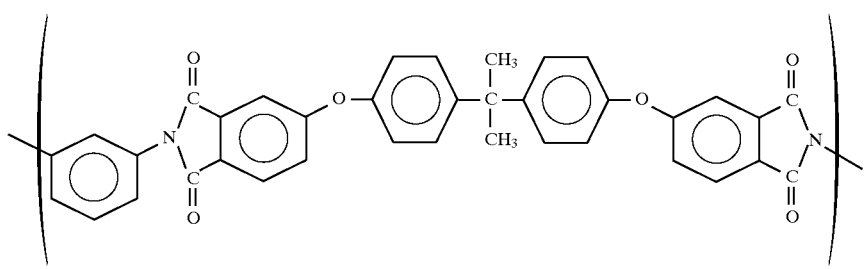

The term "polymer alloy" as used herein has almost the same meaning as a "polymer-blend" but is narrower than a "polymer blend" in the broad sense of the polymer blend in that the interaction between the constituting components is stronger than in a polymer blend. That is, the term "polymer alloy" is intended to mean a solid solution of a heat-resistant non-crystalline resin and a cured thermosetting resin in which the two components are mutually finely dispersed to such a degree that they cannot be distinguished with the naked eyes.

The mixing ratio of the heat-resistant non-crystalline resin to the cured thermosetting resin is 40/60 to 5/95, preferably 35/65 to 10/90, still preferably 30/70 to 15/85, by weight, wherein the amount of the cured thermosetting resin is the total amount of the above-described thermosetting resin and curing agent. If the proportion of the heat-resistant non-crystalline resin is too high, the mixture has an increased viscosity when mixed with a solvent for application, making application at a high concentration difficult, eventually making it difficult to apply to a large thickness as aimed at in the invention. If the proportion of the heat-resistant non-crystalline resin is too small, the effect of improving the toughness of the polymer alloy is weak. The polymer alloy used in the invention mainly comprises the cured thermosetting resin having added thereto the linear heat-resistant non-crystalline resin in order to maintain the applicability of the thermosetting resin to a large thickness and to impart toughness to the thermosetting resin. Accordingly, the amount of the heat-resistant non-crystalline resin to be added is less than 40% by weight. Where a linear heat-resistant resin is used as a heat insulating layer, it is known to add a small amount of an epoxy resin, etc. to the heat-resistant resin so as to improve the adhesion of the heat-insulating layer to the mold. The polymer alloy used in the present invention differs from this known technique in both purpose of use and composition. While the polymer alloy of the invention basically comprises the heat-resistant non-crystalline resin and the cured thermosetting resin, it may contain, if desired, other substances in minor proportions. For example, particulate or powdered glass, silica, talc or clay, various fibers such as glass fiber, whiskers and carbon fiber, can be added in appropriate amounts. Addition of appropriate amounts of these additives to the polymer alloy brings about a reduction in coefficient of thermal expansion of the polymer alloy, thus favoring the mold of the present invention.

The polymer alloy of the invention has a structure in which two phases are finely dispersed, including a polymer alloy in which the two dispersed phases form a sea-island structure, a polymer alloy in which the two dispersed phases form a sea-sea structure (each phase is continuous), and a polymer alloy having a degree of dispersion intermediate between these two structures (part of the island phase are continuous). The language "finely dispersed" as used herein means the state in which two phases are mutually dispersed to such a degree that they cannot be clearly distinguished from each other with the naked eyes. Where the two phases are close in hardness, they cannot be distinguished even if the degree of dispersion is somewhat coarse. Such a dispersed system is also included under the scope of the present invention. The sea-island structure preferably has such a structure in which islands having an average particle size of not greater than about 500 μm, particularly not greater than 200 μm, are finely dispersed. A structure comprising continuous particles and/or a structure comprising partially continuous particles (part of the islands are continuous) are particularly preferred in the present invention. The structure of continuous particles and/or the structure of partially continuous particles are structures in which particles or deformed particles having an average diameter of about 0.02 to 500 μm, preferably about 0.1 to 300 μm, are connecting to each other totally or partially. The particles include deformed particles. These continuous particles and the like are dispersed in the other phase, i.e., the matrix. The particle structure or size can be measured by dissolving part of the surface of the heat insulating layer with a solvent and observing the exposed surface under a microscope.

A complex composed of two or more polymers, which is generally called a polymer alloy, greatly varies in properties depending on the state of dispersion. The cured thermosetting resin/heat-resistant non-crystalline resin polymer alloy of the present invention also varies largely in properties depending on the state of dispersion. For example, a system comprising an epoxy resin and polyether sulfone, polyether imide or the like is dispersed uniformly on into a molecular level or to a degree close to a molecular level when kneaded under heat or compounded with a proper amount of a solvent. A uniform mixture of an epoxy resin and polyether imide provides a cured product with its morphology being controllable by selection of the composition or curing conditions, as reported in Dai 41-kai Kobunshi Gakkai Nenjitaikai Yokoshu, IP2a13, IP3a17, etc. (1992). Specifically, these two components are particularly compatible with each other, and the mixed system undergoes spinodal decomposition upon curing to induce phase separation into a sea-island structure or a sea-sea structure in a controllable manner. While the preferred phase structure of the polymer alloy of the invention can be formed through various methods, it is preferably formed by making use of a precipitation phenomenon of a compatible mixture of the epoxy resin and the heat-resistant non-crystalline resin, which is caused by spinodal decomposition of the mixture.

The details of "spinodal decomposition" are described in Nihon Gomu Kyokaishi, Vol. 62, No. 9, p. 555 (1989). In brief, as a system is transferred from a single phase region to a two phase region, the system hastily starts phase decomposition into co-existing two phases. On this occasion, the breadth of fluctuations in density in terms of wavelength become narrower, i.e., the wavelength becomes constant, whereby a structure of regular phase separation in which both phases are continuous is formed. The phase separation according to this mode is called spinodal decomposition. A polymer alloy formed in this way has a particularly preferred structure. That is, the resulting polymer alloy has such a disperse system in which one of the two phases has a structure comprising dispersed particles having a particle size of about 0.02 to 500 μm or a structure of continuous particles in which at least part of the dispersed particles are connected to each other, and this phase is dispersed in the other phase, i.e., matrix. For example, an epoxy resin and polyether sulfone are dissolved in each other at a low temperature region to form a single phase solution but, on addition of a curing agent, phase separation takes place accompanied with curing and proceeds according to spinodal decomposition to provide the polymer alloy as referred to in the present invention. The polymer alloy in which a cured epoxy resin and a heat-resistant non-crystalline resin form the above-mentioned structure exhibits excellent heat resistance and impact resistance and serves as an extremely excellent heat insulating material for use in the present invention.

The combinations of resins capable of forming the particularly preferred structure comprising continuous particles and/or partially continuous particles preferably include combinations of a cured thermosetting resin selected from a cured epoxy resin and a polycyanurate and a heat-resistant non-crystalline resin selected from polyether sulfone, polyether imide and polysulfone.

It is preferable that the polymer alloy layer covering the cavity wall of the base mold be polishable to give a mirror surface. In order for the polymer alloy layer to be polished to give a mirror surface, it is necessary that each phase constituting the polymer alloy is a finely dispersed phase and/or that the two phases are close in hardness or rate of polishing. That is, it is preferable that both phases be polished uniformly to give a smooth surface. The polymer alloy of the invention which comprises a rigid heat-resistant non-crystalline resin, such as polyether sulfone, and a cured epoxy resin serves as an extremely favorable heat insulating layer from the viewpoint of polishability as well.

The mold coated with a heat insulating layer comprising the polymer alloy should stand the heating and cooling cycles repeatedly made during molding of a synthetic resin. Therefore, it is preferable for the polymer alloy to have a large elongation at break. The polymer alloy of the invention preferably has an elongation at break of not less than 3.5%, particularly not less than 4%, especially not less than 5%. The elongation at break as referred to herein is measured according to ASTM D638 at a rate of pulling of 5 mm/min on a test piece obtained by releasing the heat insulating layer comprising the polymer alloy from the mold or by injection molding an uncured mutually solved polymer alloy (an uncured compatible mixture) into a test-piece shape followed by curing. The polymer alloy heat insulating layer formed on the mold can easily be released by heat application.

The heat insulating layer may have a single layer structure comprising the polymer alloy or a two or more layer structure comprising the polymer alloy layer and other resin layers. In the latter case, the polymer alloy layer preferably has a thickness of at least half the total thickness of the heat insulating layer. The other resins to be combined with are preferably linear high-molecular weight synthetic resins excellent in heat resistance, tensile strength, elongation at break, hardness and adhesion property. The heat-resistant non-crystalline resins as referred to in the present invention, such as polysulfone, polyether imide and polyether sulfone, are suited for this use as well. Additionally, polyallylate, polyimide, etc. are also satisfactory. Polyimide is particularly satisfactory for its excellent heat resistance and high elongation. The term "high-molecular weight polymer" as used herein means a substance having a sufficiently high molecular weight to the extent that its molecules are sufficiently entangled with each other enough for full manifestation of physical and chemical properties as a synthetic resin. For the details, refer to the description for the heat-resistant non-crystalline resins. Linear high-molecular weight polyimides having the repeating unit shown in Table 2 below are satisfactorily useful.

TABLE 2
Repeating Unit of Polymers
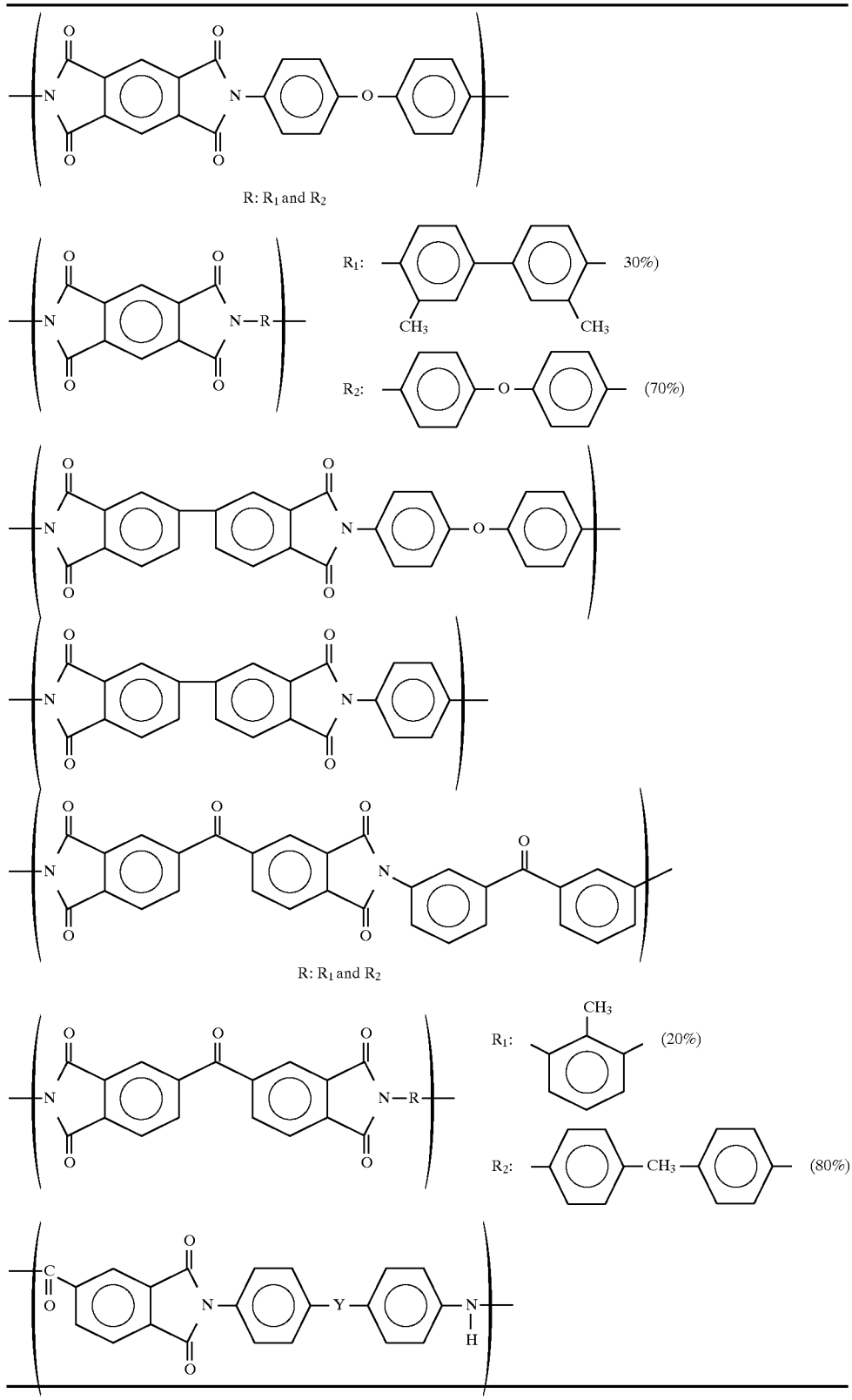

Where the heat insulating layer is composed of two layers, it is preferable that a layer comprising a linear high-molecular weight polymer having a high elongation, excellent impact resistance and moderate adhesion to a mold be provided directly on the surface of the metallic mold and a layer comprising the polymer alloy of the invention be provided thereon. It is also satisfactory to provide an additional layer comprising a linear high-molecular weight polymer as an outermost layer of the heat insulating layer. The thin layer of a polymer excellent in heat resistance and impact resistance, such as a linear high-molecular weight polyimide, provided directly on the surface of the metallic mold is effective in improving durability against molding cycles and securing moderate adhesion of the heat insulating layer to the base mold, thereby reducing occurrence of peeling during molding. Alternatively, a layer comprising the polymer alloy of the invention is provided on the metallic mold, and a layer of a linear high-molecular wight polymer excellent in heat resistance and impact resistance is provided thereon. The layer of a linear high-molecular weight polymer provided as an outermost layer is effective in further improving the durability, surface gloss, and the like.

Where the heat insulating layer is composed of three layers, the above-mentioned various effects can be expected by providing the polymer alloy layer according to the invention as an intermediate layer.

If a metallic mold is coated with a heat insulating layer having a coefficient of thermal expansion greatly different from that of the metallic mold, thermal shocks are repeatedly generated at the interface between the mold and the heat insulating layer during molding, tending to cause peeling and cracking of the heat insulating layer. Such thermal shocks are reduced by coating the metallic mold with a heat insulating layer having a coefficient of thermal expansion close to that of the mold. From this point of view, it is extremely preferable to coat the mold with a linear high-molecular weight polyimide having a coefficient of thermal expansion extremely close to that of the metallic mold.

The object of the present invention is achieved by providing a heat insulating layer comprising (1) a linear high-molecular weight polymer layer having a high elongation at break which is formed (i) at the interface between the heat insulating layer and a metallic mold where a stress is imposed the most and (ii) in the vicinity of the surface of the heat insulating layer and (2) a crosslinking-type high-molecular weight polymer layer comprising the polymer alloy of the invention that is easy to be applied to a large coating thickness as an inner layer of the heat insulating layer.

If desired, a thin metallic layer may be provided on the outermost surface of the heat insulating layer. That is, a thin metallic layer can be provided on the outermost surface of a heat insulating layer having any of the layer structure composed solely of a polymer alloy layer, the layer structure composed of a polymer alloy layer and a linear high-molecular weight polymer layer, and the layer structure composed of three layers. The metal used as the outermost layer is a metal generally used in electroplating or chemical (electroless) plating, etc. and preferably includes chromium, nickel and copper. The metallic layer is formed on the surface of the heat insulating layer to a thickness of not more than $1/5$, preferably of from $1/200$ to $1/8$, still preferably of from $1/100$ to $1/10$, of the total thickness of the heat insulating layer. If the thickness of the metallic layer is too large, the effects of coating the base mold with a heat insulating layer are reduced. If the thickness is too small, prevention of scratches, one of the objects of providing the metallic layer, could not be achieved. As far as an improvement in parting properties of the mold is concerned, the metallic layer, however thin it is, produces the effect. The term "thickness" of the metallic layer as referred to herein means an average thickness of the metallic layer.

The surface of the heat insulating layer on which the metallic layer is formed is preferably comprising a linear high-molecular weight polymer having excellent elongation at break so as to withstand the stress which is generated on repetition of the heating/cooling cycle of molding and ascribed to the difference in thermal expansion coefficient between the metallic layer and the heat insulating layer.

In order to enhance the adhesion between the metallic layer and the heat insulating layer, the surface of the heat insulating layer is preferably rendered finely uneven and then coated with metal, for example, by plating. To accomplish the above, incorporation of fine powder of calcium carbonate, silicon oxide, etc. into the outermost layer of the heat insulating layer, and etching the resulting surface of the heat insulating layer to have fine surface roughness, are conducted as needed.

The adhesive strength between the heat insulating layer and the base mold and/or between the heat insulating layer and the metallic layer should be high. It is preferably not less than 0.5 kg/10 mm-width, still preferably not less than 0.8 kg/10 mm-width, particularly preferably not less than 1 kg/10 mm-width, at room temperature, in terms of peeling strength of a 10 mm wide specimen of the heat insulating layer adhered to the base mold and/or of the metallic layer adhered to the heat insulating layer, pulled at a speed of 20 mm/min at a peeling angle of 90°. While the peeling strength thus measured shows considerable scattering depending on the location or number of determinations, what is important is that the minimum measured value be high. It is preferable that the measured peeling strength values be stably high. The term "adhesive strength" as used herein means the minimum of the values of adhesive strength measured at the main portion of the mold. In order to improve the adhesion, the surface of the base mold may be grained to have fine roughness, plated with various metals, or coated with a primer.

The total thickness of the heat insulating layer is selected appropriately from the range of from 0.05 to 2 mm. That for an injection mold is preferably 0.15 to 0.5 mm, still preferably 0.2 to 0.4 mm; and that for a blow mold is preferably 0.3 to 1.0 mm, still preferably 0.4 to 0.7 mm. The thickness of the heat insulating layer is selected appropriately according to the place of coating or whether the insulating layer is provided on the entire surface or a partial surface of the mold. The effects of the present invention are markedly produced when the heat insulating layer has a large thickens. A particularly preferred thickness in the present invention is 0.3 to 1 mm.

The heat insulating layer may be provided on either the entire surface or a partial surface of the inner wall of the base mold made of metal constituting the mold cavity. For example, it can be provided on only the molding surface that shapes the front side of a molded article, only the molding surface that shapes a sliding part of a molded article, only the molding surface that shapes the back side of a molded article, only the molding surface that shapes the edge side of a molded article, or only the angular part of the molding surface that shapes a rib or a boss on the back side of a molded article.

The polymer alloy layer can be provided by, for example, applying an uncured coating to the cavity wall of a base mold by brush coating, spray coating, etc., followed by heat curing. The viscosity of the coating to be applied is adjusted by adding a solvent or by controlling the temperature. If desired, the coating may contain thixotropic agents or levelling agents.

While the mold of the present invention, which has a heat insulating layer having a predetermined thickness according to the present invention can be produced by various methods, the following method is preferred. A heat insulating material is applied to the cavity wall of a mold and cured to form a heat insulating layer having a thickness larger than predetermined. The surface of the resulting heat insulating layer is then cut down to a predetermined thickness by means of a machine tool. Still preferably, the heat insulating layer is cut to a predetermined thickness by means of a numerically controlled (hereinafter abbreviated as NC) machine tool. In this case, the base mold is preferably one manufactured on an NC machine tool.

The term "machine tool" as used herein means a piece of machinery for making a work piece mostly made of metal into a desired shape by removing unnecessary parts through cutting or grinding, which includes a milling machine, a boring machine, a grinding machine, and a shaping machine, and a complex machine comprising these machine tools, which is generally called a machining center or a shaping center. Machine tools that are particularly preferred in the present invention is a milling machine or a machining center comprising a milling machine. A milling machine is suitable for cutting the surface of the heat insulating layer. The mode of a milling machine to be used is selected, as needed, from a face milling in which cutting is conducted with an end cutting edge of an end mill, a peripheral milling in which cutting is conducted with a peripheral cutting edge, and the like.

The term "numerical control (NC)" as used herein means controlling the movement of a cutting tool and/or a table under instructions according to numerical information. For example, an NC milling machine works under control on the relative position between a rotating end mill and a mold to be cut, the traveling speed thereof, the number of revolutions of the end mill, etc. according to instructions based on numerical information. With the recent development of microcomputers, numerical control of machine tools has become extremely high-precise and inexpensive. It has now been made possible to precisely cut the heat insulating layer on the surface of a base mold to a predetermined thickness of 0.05 to 2 mm. The recent remarkable development of machine tools has made it feasible to plane the surface of the heat insulating layer at a height of 0.05 to 2 mm from the surface of the metallic base mold. Taking a milling machine for instance, such precise cutting has now been achieved as a result of development of a hard and tough end mill cutting edge of high precision, achievement of high-speed rotation of an end mill, achievement of precise control on cutting position such as precise control on cutting pitch, and achievement of rapid removal of swarf, and the like.

In more detail, machine tools have undergone the following developments.

(1) Very tough cemented carbides, such as Tungalloy (a trade name of a commercially available product), have been developed for use as a cutting blade, e.g., of an end mill, which has made high-speed rotational cutting possible.

(2) An apparatus for efficiently cooling the bearing of the spindle rotating an end mill has been developed. For example, cooling oil is made to flow from the central axis of the spindle to the bearing thereby to suppress heat generation at the time of high-speed rotation.

(3) In general, a positional error of a machine tool is proportional to the 2nd power of the working speed. A servo controller has been developed, by which an increase in working speed is prevented from leading to aggravation of the error.

(4) A method for spraying a coolant for cooling an end mill and also for removing swarf during cutting has been improved, and the amount of a coolant that can be sprayed can be increased, which has made it possible to carry out high-speed cutting while minimizing heat generation.

As a result of these developments, the number of revolution of the spindle has reached 3,000,000 in terms of the product of a main axis diameter d (mm) and a number of revolution (rpm) (e.g., 30,000 rpm for an end mill of 100 mm in diameter). Even if a work piece is finely cut little by little without getting a deep cut at a time, high efficiency of machining can still be secured owing to the achievement of such high-speed revolution of an end mill. Further, the cut surface is made smoother by such a manner of fine cutting. Where a plane is cut using a machining center, an attainable surface precision generally reaches about 1S and, to the smoothest degree, 0.1S.

In cutting with an end mill, the cut surface gets scratches by swarf (generally called cuttings) unless the swarf is immediately removed. In the case of the face milling in which cutting is carried out with an end cutting edge of an end mill, a flat end cutting edge may prevent sufficient removal of the swarf. The swarf could easily be removed with a slightly rounded cutting edge. Therefore, a ball end mill with a slightly rounded cutting edge is preferred. However, since face milling with such a ball end mill provides a rounded cut surface in accordance with the rounded shape of the cutting edge, it is necessary to reduce the cutting pitch of the end mill so as to give as smooth a surface as possible.

In cutting using a milling machine, a side milling with a side cutting edge can also be used, as needed. A sharp part of a mold can be finished by use of a planar end mill with a flat end cutting edge.

A work piece can be cut on an NC machine tool to a precision of 0.1 $\mu$m in principle. However, the maximum precision in machining a mold is considered to be about ±10 $\mu$m due to temperature unevenness caused by heat generation in the machine tool or the work piece, irregularity of the positional control, scratches by the swarf, and the like. In the present invention, the material to be cut is a heat insulating layer comprising a heat-resistant polymer which is easier to cut, generates less heat, and less suffers from scratches, than metal. The present invention cannot be accomplished without these advantages combined with the recent improvement in precision of machine tools.

The above-described method comprising cutting the surface of a heat insulating layer by means of an NC machine tool makes it possible to apply a heat insulating coating material to a large coating thickness at a time to thereby shorten the coating step even if the coating material more or less sags during application. This eventually makes it possible to produce a heat insulating layer-coated mold economically. In the formation of a thick heat insulating layer having a thickness of 0.1 mm or greater, preferably 0.15 mm or greater, still preferably 0.2 mm or greater, in particular, the days required for application is markedly reduced, which provides a great economical advantage.

Where a heat insulating layer is cut on an NC machine tool, it is extremely desirable that the base mold itself be also manufactured by means of an NC machine tool, for making the numerical control of cutting the heat insulating layer easier.

The mold having its heat insulating layer to be prepared by cutting by a machine tool is explained below with referring to the accompanying drawings.

In FIG. 1, base mold 1 made of metal is coated with heat insulating layer 2. The surface of heat insulating layer 2 is cut by face milling with an end cutting edge of a ball end mill using an NC milling machine (FIG. 1-1). In carrying out cutting, the number of revolution of the end mill in the milling machine is increased, the cutting pitch 3 is reduced, and the curvature radius 4 of the end mill cutting edge is increased as far as causes no scratches by the swarf, to thereby make the cut surface as smooth as possible. Then the cut surface of the heat insulating layer is polished to remove skin layer 5 of the heat insulating layer to provide a smooth surface and a predetermined uniform thickness 6 (FIG. 1-2). As long as the cutting with an end mill is performed accurately, the amount of the skin layer 5 to be removed is very slight, and a smooth surface can be obtained in a short polishing time.

If desired, the surface of the heat insulating layer prepared by cutting using a machine tool to have a predetermined thickness or the surface prepared by polishing the above cut heat insulating layer to have smoothness can further be subjected to various post-treatments. For example, the surface can be thinly plated with metal, or matted by sandblasting or by applying a heat insulating solution containing inorganic fine powder, or grained by utilizing a photosensitive resin.

Next, another method for coating the surface of a mold with a polymer alloy for use in the present invention is described below. That is, the mold surface can be coated, as needed, according to a method comprising (1) preparing an article by molding in the base mold a non-adhesive synthetic resin, e.g., an ethylene-tetraflfuoroethylene copolymer, (2) applying the uncured polymer alloy for use in the present invention (i.e., a polymer alloy precursor) to the inner wall of the base mold, (3) inserting the non-adhesive synthetic resin molded article into the cavity of the mold, (4) closing the mold to bring the polymer alloy precursor on the mold wall into contact with the non-adhesive synthetic resin molded article to thereby reproduce the surface profile of the molded article, and (5) letting the polymer alloy precursor to cure sufficiently to provide a heat insulating layer in intimate contact with the inner wall of the mold.

It is desirable for the mold of the present invention that the heat insulating layer or both the heat insulating layer and the outermost metallic layer have a number of fine pores and the base mold has passageways for discharging gas from the fine pores. The fine pores as referred to herein should be that through which gas can pass but a synthetic resin cannot. The fine pores include slits. The size of the pores depends on the molding method, the molding conditions, the kind of the resin, and the like. It becomes relatively small in an injection mold, and relatively large in a mold for extrusion blow molding, vacuum forming and pressure forming. That is, the size of the pores must be such that prevents a molding resin from entering and clogging. It should be relatively small in low-viscosity and high-pressure injection molding. In general, pores of about 0.005 to 0.3 mm in diameter or slits of about 0.001 to 0.1 mm in width are preferred in injection molding. In extrusion blow molding, a molding resin usually has a high viscosity, and the resin pressure against the cavity wall is low, so that the pores can have a relatively large size. Pores of about 0.1 to 0.5 mm in diameter or slits of about 0.05 to 0.2 mm in width are preferred in extrusion blow molding. As the diameter of the pores or the width of the slits decreases, the number of the pores (or slits) should be increased. The pores are made before and/or after the heat insulating layer is provided on the mold cavity wall. They can be evenly distributed throughout the heat insulating layer but are preferably concentrated at the places where gas tends to be trapped, where the resin is charged finally or where the injection pressure is hardly transmitted. The places to concentrate the pores can be predicted by rheological analysis by CAE. If the pores are too large in size, the injected resin will enter and clog the openings and leave unacceptable marks of the pores on the molded articles. Therefore, it is preferable to provide fine pores of small size in large numbers. The language "a large number of fine pores" as referred to herein means that the fine pores are provided in large numbers enough to allow the gas in the mold cavity to escape therethrough sufficiently. With the size being small, the sufficient number is 10 or so or even more. In some cases, a single long slit could meet the purpose.

The base mold has passageways for discharging the gas from the pores. The passageways are to easily discharge the gas from the pores out of the mold and can be formed by providing tubular passageways or by making use of air-permeable metal having continuous pores or fine slits among metallic grains. The air-permeable metal having fine continuous pores through the whole body includes, for example, Porcelac produced by Shintokogio, Ltd.

Fine pores can be provided in the heat insulating layer by a laser beam, a drill, etc. A laser beam can make small holes of several tens of microns in diameter. A drill can make holes having a diameter up to 0.1 mm.

If necessary, the passageways of the base mold for discharging gas may be evacuated during molding to forcibly discharge the gas in the mold cavity. Since extrusion blow molding for producing large-sized blow moldings or expansion injection molding tends to generate air traps, evacuation of the mold cavity is especially desirable. This is the most preferred embodiment of the molding technique in the present invention.

The mold having a large number of fine pores through the heat insulating layer thereof and passageways for discharging gas from the pores through the base mold thereof is explained below with reference to FIG. 2.

In FIG. 2, base mold 7 has, provided on the surface thereof, thin metallic layer 8, such as a nickel plating layer, and further thereon heat insulating layer 9. A large number of fine pores 10 are formed through heat insulating layer 9 and thin metallic layer 8. Each fine pore 10 is connected to cylindrical hole 11 made through the base mold, which is further connected to cylindrical hole 12 open to the air. The mold shown in FIG. 2 can be prepared by, for example, as follows. The surface of base mold 7 is plated with nickel to form metallic layer 8. Cylindrical holes 11 and 12 are made in base mold 7. Afterwards, cylindrical holes 11 are sealed with screw bolt 13. Heat insulating layer 9 having a predetermined thickness is then formed. Fine pores 10 are made by means of a drill, etc. through heat insulating layer 9, nickel plating layer 8, and the skin layer of the base mold, and pores 10 and cylindrical holes 11 are connected. The cylindrical holes and the fine pores can be made by various other methods. The above described cylindrical holes are far greater than the fine pores in diameter.

If the heat insulating layer has no pore, it is difficult, in many cases, to sufficiently discharge gas in the mold cavity with only the permeability of the heat insulating layer. While the gas permeability of various synthetic resins have been determined, it is usually about 50 cc/100 in$^2$/mil/24 hr at 25° C. under atmospheric pressure. Based on this value, the amount of gas that can pass through a 0.2 mm thick heat insulating layer with no pores when a resin is injected under a gas pressure compressed by a resin pressure of 50 kg/cm² is applied to the end part of the mold, is estimated at about 0.0006 cc/cm²/0.2 mm/0.1 sec, a very small amount. It is difficult with such a small gas permeability to prevent production of air traps during blow molding of large-sized articles.

Although fine pores of the heat insulating layer leave slight marks on the resulting molded articles, the marks can be made less noticeable by buffing the molded article.

The mold according to the present invention is applicable to injection molding, blow molding, vacuum forming, compression molding, and the like. The effects of the mold are conspicuous when applied to injection molding at a low speed of in-mold resin flow and injection molding at a low resin pressure against the cavity wall. That is, the mold is particularly suitable for low pressure injection molding, such as gas-assisted injection molding, oligomer-assisted injection molding, and injection compression molding.

The mold of the present invention is also suitably applicable to blow molding. Since blow molding employs a low resin pressure against the cavity wall as compared with injection molding, the present invention produces great effects.

Figure 1A:
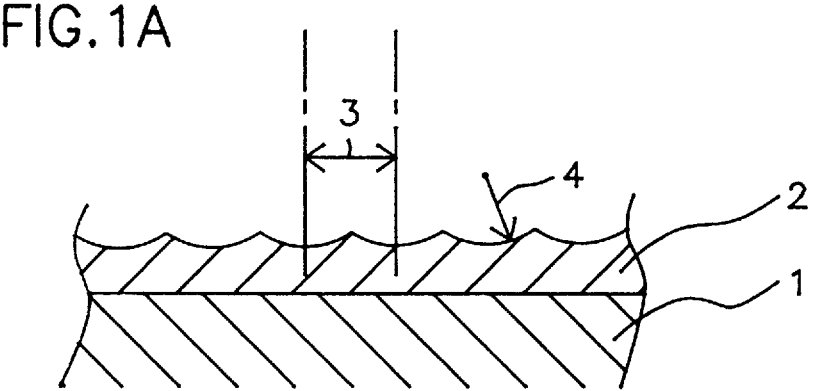
FIGS. 1A and 1B show the steps of cutting the surface of a heat insulating layer by an NC milling machine to form a heat insulating layer having a predetermined thickness.
Figure 1B:
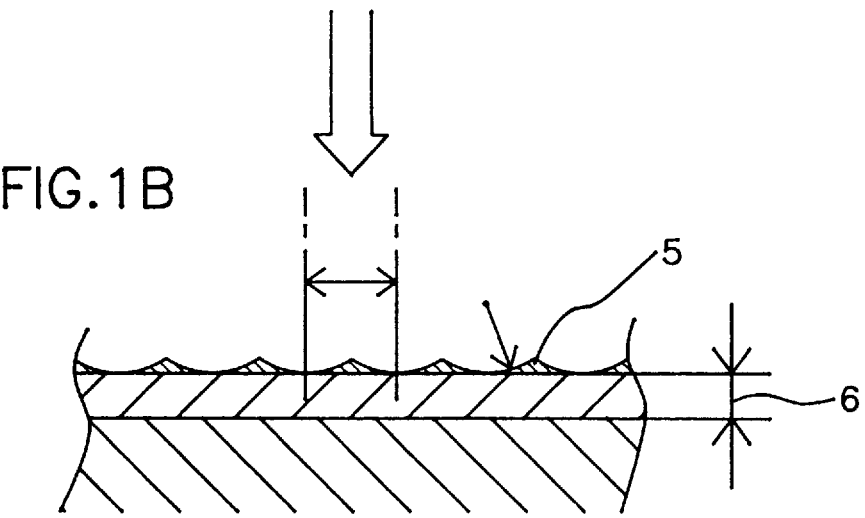

Reference Numerals:
1 Base mold
2 Heat insulating layer
3 Cutting pitch
4 Curvature radius of end mill cutting edge
5 Skin layer of heat insulating layer
6 Thickness of heat insulating layer
7 Base mold
8 Metallic layer
9 Heat insulating layer
10 Fine pore
11 Cylindrical hole
12 Cylindrical hole
13 Screw bolt
14 PES-rich phase
15 Cured epoxy resin-rich phase

THE BEST MODE FOR CARRYING OUT THE INVENTION

Figure 2:
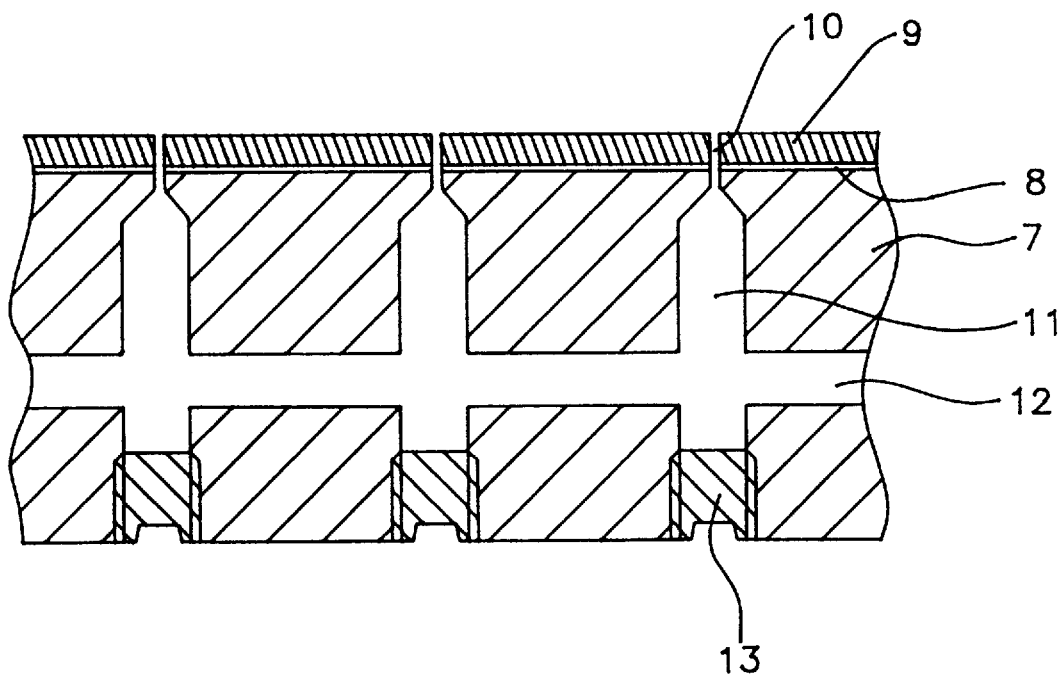
FIG. 2 shows a cross section of a heat insulating layer-coated mold having fine pores and passageways for discharging gas in the mold cavity through the heat insulating layer and the base mold, respectively.

The following base mold and materials are used.
Base Mold:
A blow mold for production of air spoilers to be fixed to the rear of passenger cars, made of a zinc alloy (ZAS), plated with nickel on its surface, having a coefficient of thermal expansion of $2.8 \times 10^{-5}/°C.$, and having passageways for discharging gas as shown in FIG. 2.
Epoxy Resin:

Bisphenol A type epoxy-resin (AER 260, a trade name, produced by Asahi Chiba K.K.).
Curing Agent:
Curing agent (2) shown above, i.e., 2,2-bis[4-(4-aminophenoxy)phenyl]propane.
Polyether Sulfone:
PES E2020P (produced by Mitsui Toatsu Chemicals, Inc.); glass transition temperature: 220° C.; tensile elongation at break: 30%.
Polyether Imide:
Ultem 1000 (a trade name, produced by General Electric Co.); glass transition temperature: 217° C.; tensile elongation at break: 60%.

EXAMPLE 1

The epoxy resin, the polyether sulfone and the curing agent are uniformly mixed at a weight ratio of 100/30/54. After adjusting the viscosity with dimethylacetamide, the mixture is applied with a brush on the inner wall of the base mold. The coating layer is heated to evaporate the solvent and to partially cure the epoxy resin and finally heated at 160° C. for 30 minutes to sufficiently evaporate the solvent and to cure the epoxy resin, to form a heat insulating layer comprising a polymer alloy formed by phase separation of the compatible mixture and having a non-uniform thickness of from 0.6 to 1.5 mm. Then, the surface of the heat insulating layer is cut by an NC milling machine at a pitch of 0.1 mm to form a heat insulating layer having a uniform thickness of 0.5 mm. The heat insulating layer comprises a polymer alloy in which one phase composed of particles having a particle size of about 200 µm is dispersed in another phase, with part of the particles being continuous. A solution of the polyether sulfone is applied thereon to form a thin polyether sulfone layer as an outermost surface layer, and the surface layer is polished to give a mirror surface.

The resulting heat insulating layer is excellent in heat resistance, toughness and hardness and intimately adhered to the base mold. The polymer alloy has an elongation at break of 5.1%. A sufficient number of fine pores having a diameter of 0.2 mm enough for discharging gas in the mold cavity are made through the heat insulating layer and the nickel plating layer.

An ABS resin is blow molded using the resulting mold having the polymer alloy heat insulating layer, to produce an air spoiler having excellent surface gloss.

Figure 3:
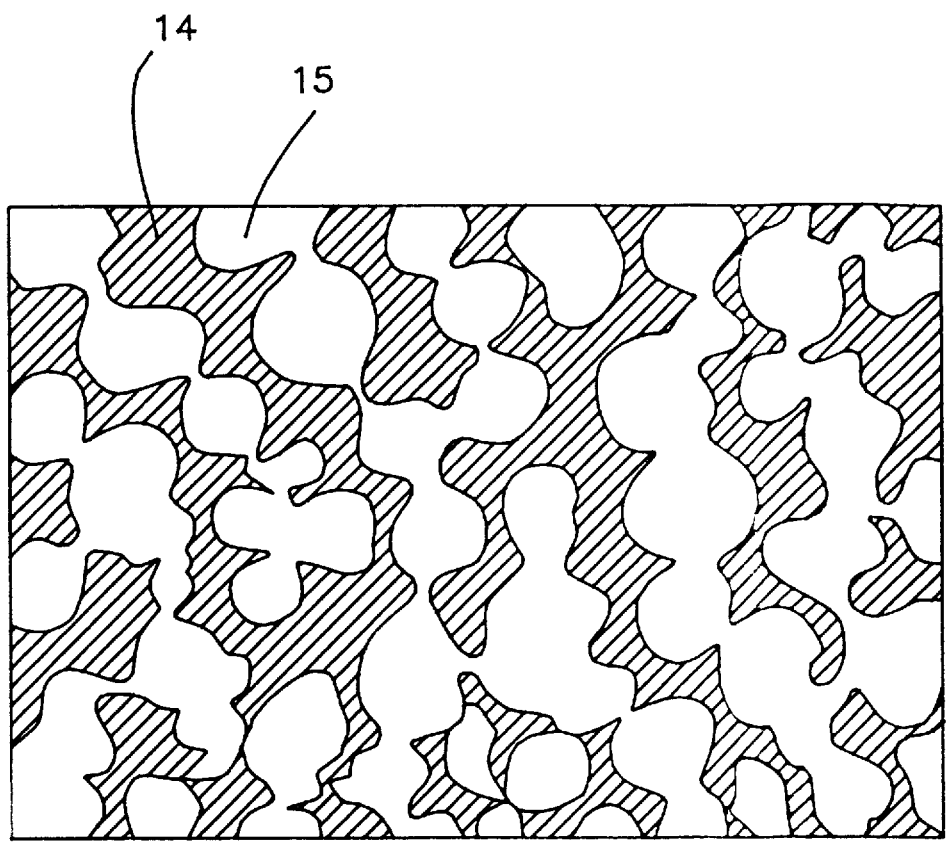
FIG. 3 shows the partially continuous structure of the polymer alloy which constitutes the heat insulating layer of Example 1.

The heat insulating layer is released from the mold surface and immersed in methylene chloride to dissolve part of the surface of the polymer alloy heat insulating layer. The exposed polymer alloy is found to have a partially continuous structure as shown in FIG. 3.

EXAMPLE 2

A solution of the polyether sulfone is applied to the inner wall of the base mold and heated to 250° C. to evaporate the solvent and to cure the resin, to thereby form a polyether sulfone layer having a thickens of 0.02 mm. On the polyether sulfone layer is formed a 0.5 mm thick heat insulating layer comprising the epoxy resin, the polyether sulfone and the curing agent, in the same manner as in Example 1. A solution of the polyether sulfone is further applied thereon to form a thin polyether sulfone layer, and the surface of the layer is polished to give a mirror finish. By providing a tough and heat resistant thin layer of the polyether sulfone between the base mold and the polymer alloy layer, the durability of the resulting mold is further improved, and a heat insulating layer-coated mold suited to blow molding of synthetic resins is provided. A large number of fine pores are made through the heat insulating layer and the nickel plating layer in the same manner as in Example 1. An ABS resin is blow molded using the resulting mold coated with the polymer alloy heat insulating layer, to thereby obtain an air spoiler having excellent surface gloss.

EXAMPLE 3

A heat insulating layer is formed on the inner wall of the base mold in the same manner as in Example 1, except for using a uniform mixture of the epoxy resin, the polyether imide and the curing agent at a weight ratio of 100/30/54. The compatible mixture undergoes phase separation to give a polymer alloy heat insulating layer comprising finely dispersed two phases, one rich in the epoxy resin and the other rich in the polyether imide. A solution of the polyether sulfone is applied thereon to form a thin polyether sulfone layer, and the surface of the layer is polished to give a mirror finish. The resulting polymer alloy has three times as much impact strength as a cured product of the epoxy resin alone, and the mold coated with the heat insulating layer comprising such a polymer alloy is suitable for blow molding of synthetic resins. After making a large number of fine pores through the heat insulating layer in the same manner as in Example 1, an ABS resin is blow molded using the resulting mold, to thereby obtain an air spoiler having excellent surface gloss.

Industrial Applicability

The present invention makes it possible to provide a durable mold coated with a thick heat insulating layer. Use of the mold in injection molding or blow molding of synthetic resins provides molded articles having a satisfactory appearance.

We claim:

1. A mold for molding a synthetic resin which comprises a base mold comprising a metal, the inner wall constituting the mold cavity being coated with a heat insulating layer having a thickness of 0.05 to 2 mm, wherein the heat insulating layer comprises a polymer alloy comprising (A) a heat-resistant non-crystalline resin of a linear high-molecular weight polymer containing an aromatic ring in the main chain thereof and having a glass transition temperature of not lower than 150° C. and an elongation at break of not less than 10% and (B) a cured thermosetting resin at a mixing ratio (the heat-resistant non-crystalline resin/the cured thermosetting resin) of from 40/60 to 5/95 by weight.

2. The mold for molding a synthetic resin as claimed in claim 1, wherein the mixing ratio (the heat-resistant non-crystalline resin/the cured thermosetting resin) is 35/65 to 10/90 by weight.

3. The mold for molding a synthetic resin as claimed in claim 1, wherein the mixing ratio (the heat-resistant non-crystalline resin/the cured thermosetting resin) is 30/70 to 15/85 by weight.

4. The mold as claimed in any one of claims 1 to 3, wherein the heat insulating layer has a thickness of 0.3 to 1 mm.

5. The mold for molding a synthetic resin as claimed in claim 1, wherein the cured thermosetting resin is a cured epoxy resin.

6. The mold for molding a synthetic resin as claimed in claim 1, wherein the cured thermosetting resin is a polycyanurate.

7. The mold for molding a synthetic resin as claimed in claim 1, wherein the heat-resistant non-crystalline resin is a resin selected from polyether sulfone, polyether imide and polysulfone.

8. The mold for molding a synthetic resin as claimed in claim 1, wherein the polymer alloy is one formed from a compatible mixture of the heat-resistant non-crystalline resin and the thermosetting resin through phase separation induced by curing of the thermosetting resin, and the polymer alloy has a structure in which the two phases are mutually finely dispersed and the dispersed particles are continuous or partially continuous.

9. The mold for molding a synthetic resin as claimed in claim 1, wherein the heat insulating layer is formed by providing a heat insulating layer on the inner wall of the base mold to a larger thickness than predetermined and cutting the surface of the heat insulating layer by a machine tool to a predetermined thickness.

10. The mold for molding a synthetic resin as claimed in claim 9, wherein the machine tool is numerically controlled.

11. The mold for molding a synthetic resin as claimed in claim 1, wherein the heat insulating layer comprising at least a layer comprising the polymer alloy as claimed claim 1 and a layer comprising a linear high-molecular weight polymer, and the layer comprising the polymer alloy layer has a thickness of at least half the total thickness of the heat insulating layer.

12. The mold for molding a synthetic resin as claimed in claim 1, wherein the heat insulating layer has, provided thereon as an outermost layer, a metallic layer having a thickness of not more than $\frac{1}{5}$ of the total thickness of the heat insulating layer.

13. The mold for molding a synthetic resin as claimed in claim 1, wherein the heat insulating layer or both the heat insulating layer and the outermost metallic layer have a large number of fine pores, and the base mold has passageways for discharging gas from the fine pores.

* * * * *